F. H. STERLING.
BRUSH.
APPLICATION FILED MAY 22, 1913.
1,136,495.
Patented Apr. 20, 1915.
3 SHEETS—SHEET 1.
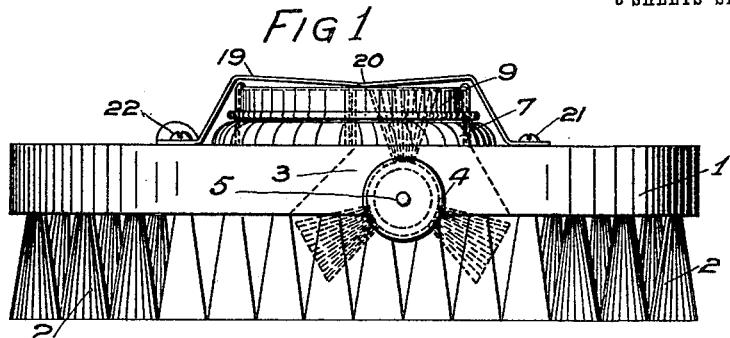
Fig 1
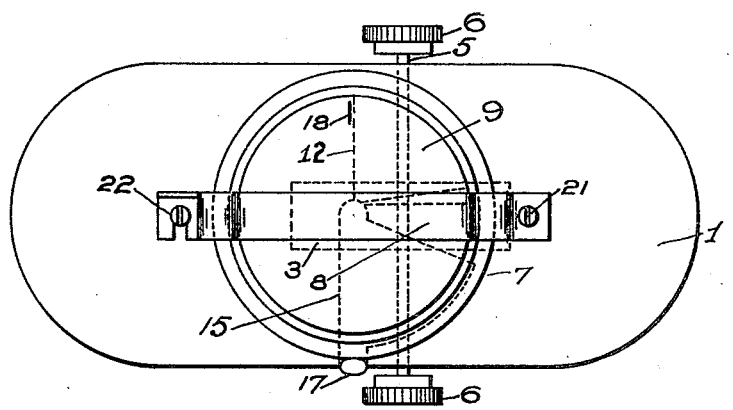
Fig 2
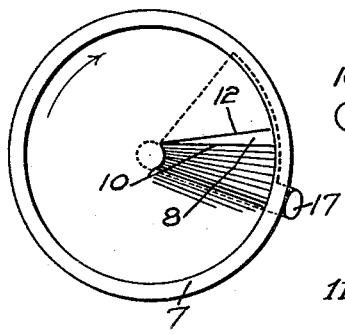
Fig 4  Fig 6  Fig 7
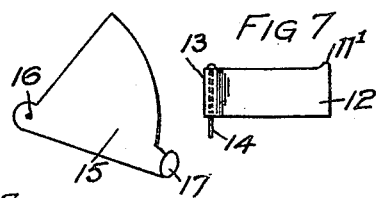
Fig 5
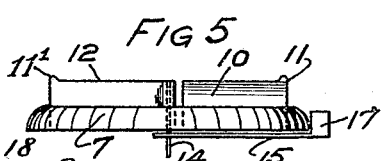
Fig. 3.ª
WITNESSES
John C. Sanders
M. B. Cottrell
INVENTOR:
Frank Henry Sterling
BY Wallace White
ATTY.

F. H. STERLING.
BRUSH.
APPLICATION FILED MAY 22, 1913.
1,136,495.
Patented Apr. 20, 1915.
3 SHEETS—SHEET 2.
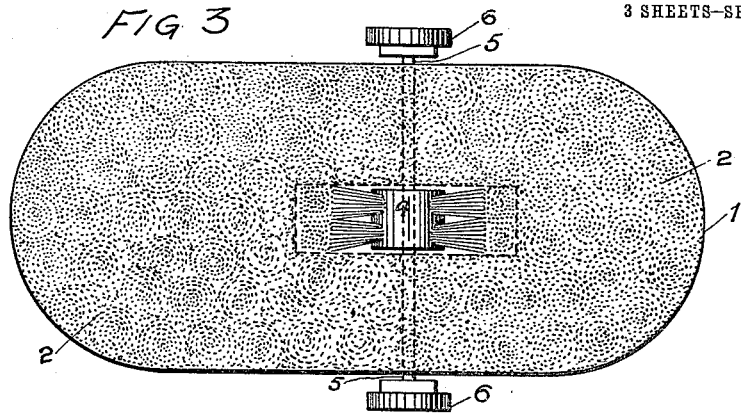
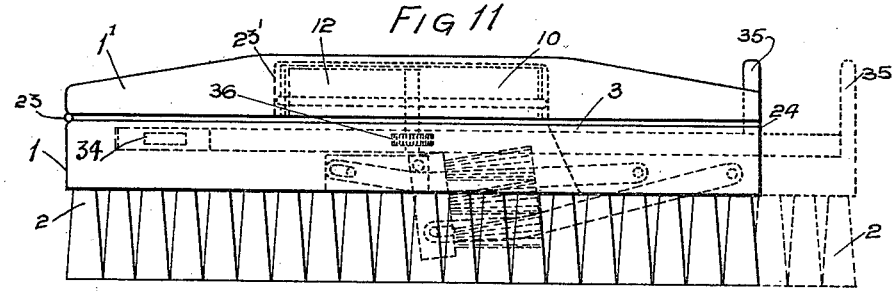
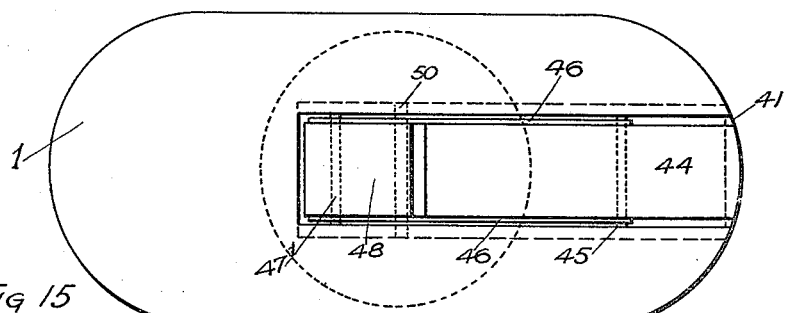
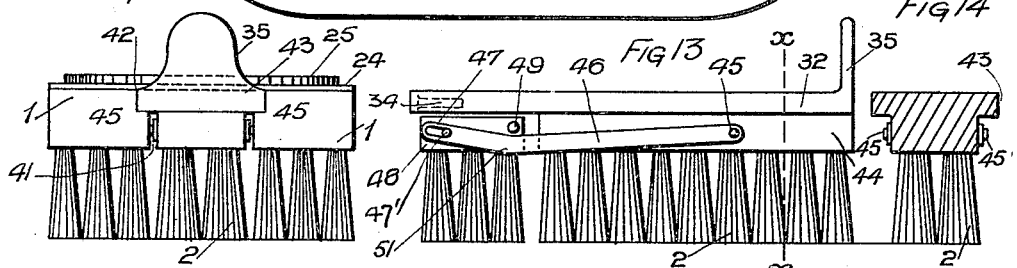
WITNESSES:
John C. Sanders
M. B. Cottrell
INVENTOR:
Frank Henry Sterling
BY Wallace White
ATTY

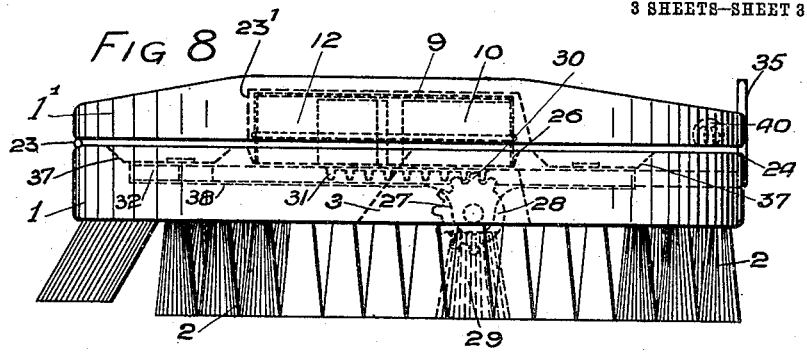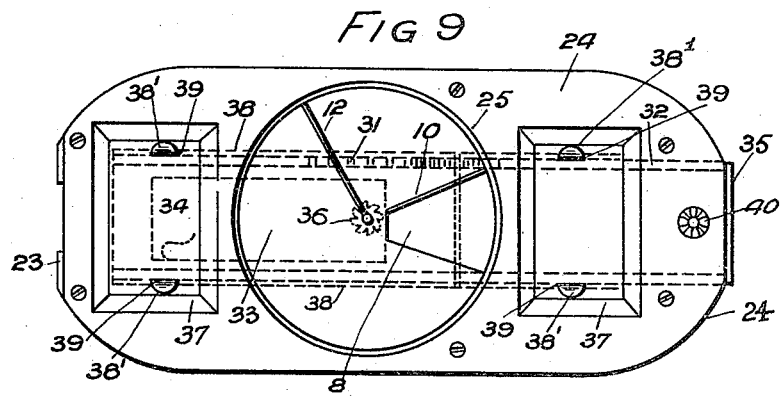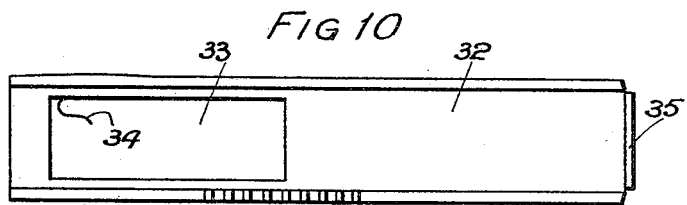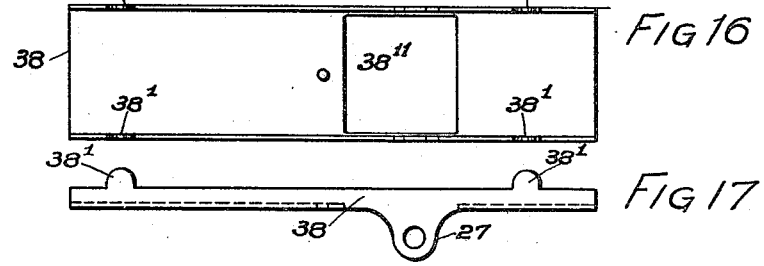

UNITED STATES PATENT OFFICE.

FRANK HENRY STERLING, OF HIGHBURY, LONDON, ENGLAND.

BRUSH.

1,136,495. Specification of Letters Patent. Patented Apr. 20, 1915.

Application filed May 22, 1913. Serial No. 769,134.

*To all whom it may concern:*

Be it known that I, FRANK HENRY STERLING, a subject of the King of Great Britain, residing at 107 Highbury New Park, Highbury, in the county of London, England, Great Britain, have invented new and useful Improvements in Brushes, of which the following is a specification.

My invention relates to improvements in Brushes combined with receptacles for containing substances to be applied by such brushes and the object of my improvements is to so construct a brush as to enable a box in which for instance stove or boot polish of a pasty consistency is usually put up for sale to be applied to or inserted in the brush and the contents of such box to be fed to the brush directly from the box at will from time to time until the box is exhausted of such contents and this without the necessity of removing the box after it has been applied to or secured in the brush until such box has become exhausted of its contents when such box is removed and a fresh, charged, box is inserted or secured in the brush. I attain this object by the means and mechanism illustrated in the accompanying drawings in which:—

Figure 1 is a side elevation of a brush in one form of construction according to my invention, having a tin or box of polish secured thereto. Fig. 2 is a top plan view of same. Fig. 3 is a bottom plan view of same. Fig. 3ᵃ is a sectional view taken on the line A—B of Fig. 1. Figs. 4 and 6 are plan views, and, Figs. 5 and 7 are side views of details hereinafter referred to. Figs. 8 and 11 are side elevations of a brush in other forms of construction according to my invention. Fig. 9 is a plan view of the plate and accessories hereinafter described. Fig. 10 is a plan view of the rack slide also hereinafter referred to. Fig. 12 is an outline bottom plan view of the brush stock showing a detail of the modified construction illustrated by Fig. 11. Fig. 13 is side elevation of such detail. Fig. 14 is a sectional view of same taken on lines *x. x.* Fig. 13. Fig. 15 is an end view of the brush stock according to Fig. 11. Figs. 16 and 17 are respectively a plan view and a side elevation of the guide hereinafter referred to.

The same reference numerals denote the same parts throughout the figures.

Referring to Figs. 1 and 2, 1 is the brush stock in which are inserted in the usual way bristles 2. Formed completely through the brush stock is an aperture 3 in which rotates an auxiliary brush 4. The brush 4 is formed of a stock which may be round, square, triangular or of other suitable shape and may be provided with bristles (if formed circular) throughout the whole of its periphery or at intervals as shown in Fig. 1: or (if of other shape) the bristles may be disposed at each flat face of such stock. The brush 4 is secured on the central portion of a shaft 5 which rotates in bearings formed by perforating the stock 1 throughout its width, the said shaft being furnished with the milled disks 6 to facilitate the rotation of the shaft 5 by the fingers. Secured by pinning, screwing or otherwise to the upper part of the stock 1 is the part 7 formed of thin sheet metal, aluminium or tin plate for instance. The part 7 approximates in arrangement and dimensions to the ordinary lid of a tin or box in which metal, boot, stove polish or the like of the pasty variety is usually marketed, *i. e.* it is a flat disk with an upstanding rim throughout its circumference and is secured on the upper side of the brush stock 1 with its rim uppermost, or instead of an upstanding rim the flat portion of the disk may have a circular recess formed therein. Through the flat portion of the part 7 is an aperture 8 corresponding and (when fixed to the brush stock 1) coinciding with the aperture 3 in the brush stock 1. 9 is a tin or box of stove, metal or boot polish for example from which the lid has been removed and which tin or box is placed (with its open part downward) in engagement with the rim or in the circular recess as the case may be in the part 7 which it accurately fits. There is thus provided a communication between the interior of the tin or box 9 and the underside of the brush stock 1. The auxiliary brush 4 is so mounted in the brush stock 1 that on its being rotated the free end of its bristles will enter the tin or box and pick up a portion of the contents thereof, and on the rotation being continued its bristles with such portion of the tin or box contents will be carried into or amongst the bristles 2 of the brush proper until the free ends of the former bristles are in about a line with the free ends of the bristles 2 in the brush stock 1.

At one side of the aperture 8 in the part 7 is a sheet metal blade 10 shaped as shown in Fig. 5. This blade is rigid with the flat portion of the part 7 and is preferably struck up from such flat portion when forming the aperture 8, *i. e.* the blade may be composed of the metal displaced for forming the aperture 8, or it may be formed independently of the flat portion of the part 7 and secured thereto. The blade so operates as to interrupt the polishing or the like paste as will hereinafter appear and cause it to be guided to the brush 4 on such paste being pressed toward the blade 10 by the scraper 12 hereinafter referred to. The blade 10 also prevents the paste being moved past the aperture 8 beyond the path of the brush 4. The blade 10 in depth corresponds with the depth of the tin or box 9 and is provided with the hump 11 to engage the annular channel usually formed at the bottom of the tin or box 9. As will be seen the blade or deflector 10 is in longitudinal dimensions approximately one half the internal diameter of the tin or box 9.

12 is a metal blade or scraper formed as shown more clearly by Fig. 7. The blade or scraper 12 is formed (preferably by bending the material) with an eye 13 to receive the pin 14 by which it is pivotally secured at the center of the part 7 within the rim or circular recess by driving such pin through the center of the flat portion of such part into the stock 1 of the brush proper. The blade or scraper 12 is approximately equal in longitudinal dimensions to one half of the diameter of the tin or box and corresponds in width with the depth of the tin or box. It is also furnished with a hump 11' for the same purpose as the hump 11 on the deflector 10.

15 is a piece of thin flat metal preferably shaped as shown and is positioned between the underside of the flat portion of the part 7 and the upper part of the brush stock 1. As shown in Fig. 6 the part 15 has a perforation 16 through which the pin 14 passes to the stock 1 and on which pin the part 15 is free to be rocked.

17 is a finger piece serving to move the part 15 in a backward and forward direction on the pin 14. The object of the part 15 is to close the aperture 8 in the flat portion of the part 7 (when the brush is not being used) to retard evaporation of any volatile ingredient of the polish or the like as will be fully understood.

18 is an indentation formed in the bottom portion of the tin or box 9 and projecting therein, the purpose of which indentation is to engage the blade or scraper 12 at its upper edge so that when the tin or box 9 is rotated as will hereinafter appear the blade or scraper 12 is carried around on its pivot therewith.

19 is a band of springy metal of the shape as shown so as to exert pressure at the point 20 of the tin or box 9 thus retaining such box or tin rotatably in position in the part 7, the tin or box 9 fitting on to the rim (or in the circular recess) on such part 7 as in the case of the usual lid or cover of a polish or the like tin or box. The band 19 is pivotally secured to the stock 1 at one of its ends by a pin or screw 21 by means of which it can be swung away from or over the tin or box 9 and secured in position by means of a slot formed at its other end sliding under the head of a screw or pin 22 inserted in the brush stock 1.

Referring to Figs. 8 and 9 which illustrate a modification of my brush, the brush stock proper is formed in two portions 1 and 1' such portions being hinged at one end or side but preferably as shown at 23 so that the part 1' may close down on to the part 1 lid-wise. The portion 1' has formed centrally therein at 23' a recess so dimensioned as to snugly accommodate the body part of an ordinary polish or the like tin or box, such as shown at 9. The brush stock 1 is preferably dished or hollowed longitudinally through the greater part of its width, such dishing or hollowing reaching within a short distance from each of its ends as shown by Fig. 8. An aperture 3 through the portion 1 of the stock is formed as in the previous case. 24 is a metal plate which is secured to the upper side of the brush stock 1 by screwing or otherwise. 25 is a rim disposed vertically to the said plate and adapted to accurately fit the opening of the body of the tin or box in which the polish or the like to be supplied to and applied by means of the brush is usually sold: or instead of the rim 25 the plate may be recessed as shown at 26— Fig. 8 to receive the open part of the tin or box 9. The plate 24 is apertured within the said rim or recess as at 8 which aperture coincides with the aperture in the stock 1 as previously described in reference to Figs. 1 and 2. Pivoted in bearings 27 projecting into the aperture 3 and which bearings may be secured to the underside of the plate 24 at a right angle therewith or formed on the guide hereinafter referred to is an auxiliary brush composed of the rocking stock 28 carrying bristles 29 which operate amongst the bristles of the brush proper. To the rocking stock of the auxiliary brush or to the shaft to which such stock is rigidly secured is secured a pinion or toothed segment 30 which meshes with the rack 31 formed on one edge of the slide 32. The slide 32 is apertured at 33 so as not to obstruct the aperture 3 when drawn and has secured thereto in any manner or formed integral therewith a flexible tongue or pawl 34 and is provided with a grip part 35. The tongue or pawl 34 may be composed of a piece of springy brass sheet or tin plate and is adapted to engage on the movement of the slide 32 in one direction with the pinion 36 attached to the blade or scraper 12 in this construction. The pinion or toothed disk 36 which may be formed of tin plate is secured to the blade or scraper 12 by means of a pin rigidly secured to the inner end of such scraper, the pin being passed through the plate 24 and the pinion 36 rigidly secured to the pin. In this way the blade or scraper 12 is on the upper side of the plate 24 and the pinion 36 on the underside of such plate. 37 are recesses or depressions formed in the plate 24 to operate as bearing surfaces for the slide 32 which it must be understood is located at the under side of the plate 24. 38 is a guide formed as shown by Figs. 16 and 17 which is also located at the under side of the plate 24 and below the slide 32 and operates in maintaining the slide 32 in position. The said guide is apertured at 38″ so as not to obstruct the aperture 3 and is formed with tongues 38′ which pass through slots 39 in the plate 24 and bent down on to such plate. The bearings 27 hereinbefore referred to may be formed integral with the guide 38 as shown in Figs. 16 and 17. The two portions of the brush stock 1 and 1′ are held to each other by any suitable means, such means may consist of a press or snap button 40 similar to that employed for the fastening of gloves.

According to another modification shown by Figs. 11, 12, 13, 14 and 15, I form the stock 1 of the brush with a slot therein as shown at 41— Figs. 12 and 15. This slot extends about two thirds through the length of the stock portion 1 the two longer sides of the slot being preferably grooved or rabetted as shown at 42 to receive the tongues or projecting parts 43 on the slide piece 44. The slide piece 44 is secured to the slide 32 and is preferably composed of wood and is furnished with bristles 2. Pivoted at 45 to the slide piece 44 is a metal link 46, the link at its other end 47 being pivoted to the auxiliary brush 48. The auxiliary brush 48 is similarly united to the slide piece 44 at its other side. The auxiliary brush 48 is drilled at 49 to receive the pin 50 on which the brush 48 is free to move, the pin 50 passing through the stock 1 and the brush 48 thus holding the latter in position in the slot in the stock 1. The link 46 is bent as at 51 to avoid contact with the pin 50. As shown in Fig. 13 the link 46 is slotted at that end where it engages with the pin 47′ to facilitate easy movement of the brush 48. As will be obvious in this construction I dispense with the rack 31, the toothed segment or pinion 30, the guide 38 together with the bearings 27 supporting the auxiliary brush such brush taking the form illustrated at 48, the construction in all other respects being essentially the same as described with reference to Figs. 8 and 9.

The operation is as follows:—Referring to Figs. 1, 2 and 3 a tin or box of say boot polish having been obtained the bottom of the tin or box is indented near its circumference inwardly as shown at 18 and the lid is then removed. The end of the band 19 is slid from under the screw or pin 22 and the band is swung around on the screw or pin 21. The part 15 is then moved so as to cover the aperture in the stock. The scraper 12 is then rotated on its pivot toward the deflector 10 to which the scraper thus lies closely adjacent, and approximately parallel thereto, the scraper in such position being on that side of the deflector farther removed from the aperture 8, i. e. the blade or deflector 10 becomes interposed between the aperture 8 and the blade or scraper 12. The open part of the box or tin 9 (with its contents) is then pressed into engagement with the part 7, the projection 18 coming between the parts 12 and 10 and the band 19 swung around over the inverted tin or box and brought into engagement with the pin or screw 22. To use the brush the part 15 is moved and the aperture in the brush stock 1 and part 7 uncovered. The auxiliary brush is rotated which causes its bristles to contact with the contents of the box or tin, a portion of such contents being picked up by the auxiliary brush and carried between the bristles of the brush proper which portion of contents is then distributed over the article being polished—for instance—by the brush proper. When more of the contents of the box or tin is required the auxiliary brush is again rotated and so on. After use the part 15 is moved and the aperture is closed. In order to move the contents of the box or tin toward the blade or deflector and into the path of the auxiliary brush the box or tin is slightly rotated from time to time in its position on the part 7 in the direction shown by the arrow in Fig. 4—the rotation of the said tin or box by reason of the projection 18 carries with it the blade or scraper 12 which insures the contents of the tin or box being pressed up to the auxiliary brush and wholly removed from the box or tin by such brush. When the box or tin has been exhausted of its contents the empty tin or box is removed and a fresh one substituted.

The operation in the case of the modification shown by Figs. 8, 9 and 10 is as follows:—The uncovered tin or box of material (which tin or box in this case has not to be indented) after arranging the blade or scraper as before is brought into engagement with the rim or into the recess in the plate 24 and the portion 1′ of the stock is closed down on to the stock proper of the brush. The slide 32 is then drawn outward by pulling on the grip 35. The outward movement of the slide causes the aperture in the brush stock which it covers to be uncovered and the bristles of the auxiliary brush to move through the aperture in the stock of the brush proper and enter the box or tin and contact with the contents thereof, the tongue or pawl on the slide engaging with the toothed disk 36 transmits a small movement to the blade or scraper 12 which (as in the previous instance) when a fully charged box or tin is placed in the brush is brought close up to the blade or deflector 10. On the return of the slide the bristles of the auxiliary brush (with a portion of the tin or box contents) are brought down to and amongst the bristles of the brush proper, the tongue or pawl 34 on the inward travel of the slide 31 exerting no influence on the toothed disk 36. In this construction the box or tin, as will be obvious, has not to be rotated.

The operation in the case of the modification as illustrated by Figs. 11, 12, 13, 14 and 15 is precisely similar to the preceding instance except as to the method of operating the auxiliary brush. On pulling on the hand grip 35 the auxiliary brush 48 is caused to turn on the pin 50, the bristles thereof moving in an upward direction as indicated in dotted lines in Fig. 11 and (on the slide 32 being fully drawn which carries with it the part 44) to enter the box or tin 9. On returning the slide to its normal position the bristles of the auxiliary brush 48 are brought down (with some material from the box or tin thereon) to the bristles of the brush proper.

Although bristles throughout have been referred to it is obvious that material such as wire, felt, wash leather or the like may be employed for certain purposes.

I do not bind myself to the exact details of construction as herein described as naturally they may vary within limits without departing from my invention.

I claim:—

1. In a polishing brush, in combination, a stock provided with bristles, means for holding a box of polishing material on said stock, and an auxiliary brush supported on said stock for transferring the material from the box to the surface to be polished, such auxiliary brush operating among the bristles in the stock.

2. In a polishing brush, in combination, a stock provided with bristles, means for holding a box of polishing material on said stock, and an auxiliary brush rotatably supported on said stock for transferring the material from the box to the surface to be polished, such auxiliary brush operating among the bristles in the stock.

3. In a polishing brush, in combination, a stock provided with bristles and having an aperture formed therein, means for holding an open box of polishing material upon said stock with the opening in the box registering with the aperture in said stock, and means supported on said stock operating among the said bristles and adapted to transfer the material from the box to the surface to be polished.

4. In a polishing brush, in combination, a stock provided with bristles and having an aperture formed therein, means for holding an open box of polishing material upon said stock with the opening in the box registering with the aperture in stod stock, and an auxiliary brush rotatably supported on said stock operating among the said bristles and adapted to transfer the material from the box to the surface to be polished.

5. In a polishing brush, in combination, a stock provided with bristles and having an aperture formed therein, means for holding an open box of polishing material upon said stock with the opening in the box registering with the aperture in said stock, and an auxiliary brush rotatably supported on said stock below said aperture and provided with bristles adapted to extend through said aperture into engagement with the material in the box, and means for rotating said auxiliary brush whereby the bristles thereof will transfer the material from the box to the surface to be polished.

6. In a polishing brush, in combination, a stock provided with bristles and having an aperture formed therein, means for holding an open box of polishing material upon said stock with the opening in the box registering with the aperture in said stock, means supported on said stock operating among the polishing bristles and adapted to transfer the material from the box to the surface to be polished, and means for pressing the material in the box toward the aperture in said stock whereby as material is removed from the box more material may be supplied in its place, such means consisting of a scraper moving on a pivot on the brush stock and operating in the box.

FRANK HENRY STERLING.

Witnesses:
MELLIE STERLING,
M. FOWLER.

Copies of this patent may be obtained for five cents each, by addressing the "Commissioner of Patents, Washington, D. C."